(12) United States Patent
Ryuhan et al.

(10) Patent No.: US 7,506,426 B2
(45) Date of Patent: Mar. 24, 2009

(54) MACHINE TOOL

(75) Inventors: Miki Ryuhan, Sakai (JP); Koji Kashu, Sakai (JP); Akira Inoue, Sakai (JP)

(73) Assignee: Shin Nippon Koki Co., Ltd. (JP)

( * ) Notice: Subject to any disclaimer, the term of this patent is extended or adjusted under 35 U.S.C. 154(b) by 0 days.

(21) Appl. No.: 11/897,398

(22) Filed: Aug. 30, 2007

(65) Prior Publication Data

US 2008/0096746 A1 Apr. 24, 2008

(51) Int. Cl.
 *B23P 23/00* (2006.01)
(52) U.S. Cl. .................. 29/558; 29/26 A; 409/212
(58) Field of Classification Search .......... 483/30; 29/558, 26 A, 56.5; 409/202, 212; 144/117.1, 144/135.2
See application file for complete search history.

(56) References Cited

U.S. PATENT DOCUMENTS

| | | | | |
|---|---|---|---|---|
| 5,340,247 A | * | 8/1994 | Cuneo et al. | 29/26 A |
| 5,988,239 A | * | 11/1999 | Chen | 144/117.1 |
| 6,262,839 B1 | * | 7/2001 | Wixey et al. | 144/117.1 |
| 6,327,761 B1 | * | 12/2001 | Magnuson | 29/26 A |
| 6,347,259 B1 | * | 2/2002 | Goldenberg et al. | 700/218 |
| 6,859,988 B2 | * | 3/2005 | Lovchik et al. | 29/558 |

FOREIGN PATENT DOCUMENTS

JP 61038835 A * 2/1986
JP 10-263959 10/1998

* cited by examiner

*Primary Examiner*—Dana Ross
(74) *Attorney, Agent, or Firm*—Gerald E. Hespos; Anthony J. Casella

(57) ABSTRACT

A machine tool includes a table, a main spindle unit, a cross rail, a plurality of columns and a plurality of supportive transfer mechanisms. The plurality of columns vertically guide the cross rail, the columns being erected at positions on opposite sides of the table and on front and rear sides of the center of gravity of the main spindle unit on each side of the table. The supportive transfer mechanisms vertically move the cross rail while supporting the cross rail. The cross rail has a pair of supporting portions for supporting front and rear portions of the main spindle unit located frontward and rearward with respect to the center of gravity of the main spindle unit, respectively, and a plurality of through holes through which the columns are passed vertically.

17 Claims, 9 Drawing Sheets

MACHINE TOOL

BACKGROUND OF THE INVENTION

1. Field of the Invention

The present invention relates to a machine tool.

2. Description of the Related Art

There exist conventionally know machine tools which are designed to machine a workpiece by moving a cutting tool relative to the workpiece while rotating the cutting tool.

As an example, Japanese Unexamined Patent Publication No. 10-263959 describes a machine tool including a table which is made movable along an X-axis in a horizontal plane with a workpiece placed on the table, a main spindle unit mounted above the table for rotating a cutting tool attached to the main spindle unit, a cross rail supporting the main spindle unit movably along a Y-axis at right angles to a feed direction (X-axis) of the table in a horizontal plane, and a pair of columns installed on opposite sides of the table, the pair of columns supporting the cross rail in such a way that the cross rail can move up and down. The machine tool cuts the workpiece into a desired shape by means of the cutting tool while controllably moving the table, the main spindle unit and the cross rail in different directions.

The machine tool of the aforementioned patent Publication is configured such that the two columns each have a generally C-shaped horizontal cross section with open sides of the columns directed face to face with each other. The two columns support the cross rail, embracing opposite ends thereof within inward-directed openings of the columns. The cross rail supports the main spindle unit in balance from both sides along the X-axis so that the main spindle unit would not lean by its own weight in one direction along the X-axis. This serves to prevent a reduction in machining accuracy due to tilting of the cutting tool attached to the main spindle unit.

One problem of a prior art arrangement shown in the aforementioned patent Publication is that the machine tool requires a large-sized pair of vertical columns. Since these columns each have a generally C-shaped horizontal cross section and support the cross rail by embracing the opposite ends thereof within the inward-directed openings as stated above, each of the columns must have a width larger than that of the cross rail along the X-axis. Additionally, to sufficiently avoid deformation and changes in posture of the cross rail caused by a force exerted thereupon as a result of movement of the main spindle unit in the aforementioned cross rail supporting mechanism, it is necessary for the columns to have increased stiffness to stably support the cross rail. This would result in a further increase in size of the columns.

SUMMARY OF THE INVENTION

It is an object of the invention to provide a machine tool having a slim structure capable of preventing deformation and changes in posture of a cross rail and a reduction in work-machining accuracy due to such deformation and changes in posture of the cross rail.

According to a principal aspect of the invention, a machine tool for machining a workpiece by moving a cutting tool relative to the workpiece while rotating the cutting tool includes a table, a main spindle unit, a cross rail, a plurality of columns and a supportive transfer system. The table is configured to be movable along a specific feed direction in a horizontal plane with the workpiece placed on a top surface of the table. The main spindle unit includes a main spindle for rotating the cutting tool attached thereto with the main spindle positioned perpendicular to the top surface of the table, the main spindle unit being configured to be movable along a moving direction perpendicular to the feed direction of the table in a horizontal plane above the table. The cross rail supports the main spindle unit in such a manner that the main spindle unit can move along the aforementioned moving direction perpendicular to the feed direction of the table in the horizontal plane. The plurality of columns vertically guide the cross rail, the columns being erected at positions on opposite sides of the table along the moving direction of the main spindle unit and the columns being located on front and rear sides of the center of gravity of the main spindle unit along the feed direction of the table. The supportive transfer system vertically moves the cross rail while supporting the cross rail. In this machine tool of the invention, the cross rail has a pair of supporting portions for supporting front and rear portions of the main spindle unit located frontward and rearward along the feed direction of the table with respect to the center of gravity of the main spindle unit, respectively, and a plurality of through holes through which the aforementioned columns are passed vertically. The columns passed through the respective through holes support the cross rail movably up and down.

These and other objects, features and advantages of the invention will become more apparent upon a reading of the following detailed description in conjunction with the accompanying drawings.

DETAILED DESCRIPTION OF THE PREFERRED EMBODIMENTS

Figure 1:
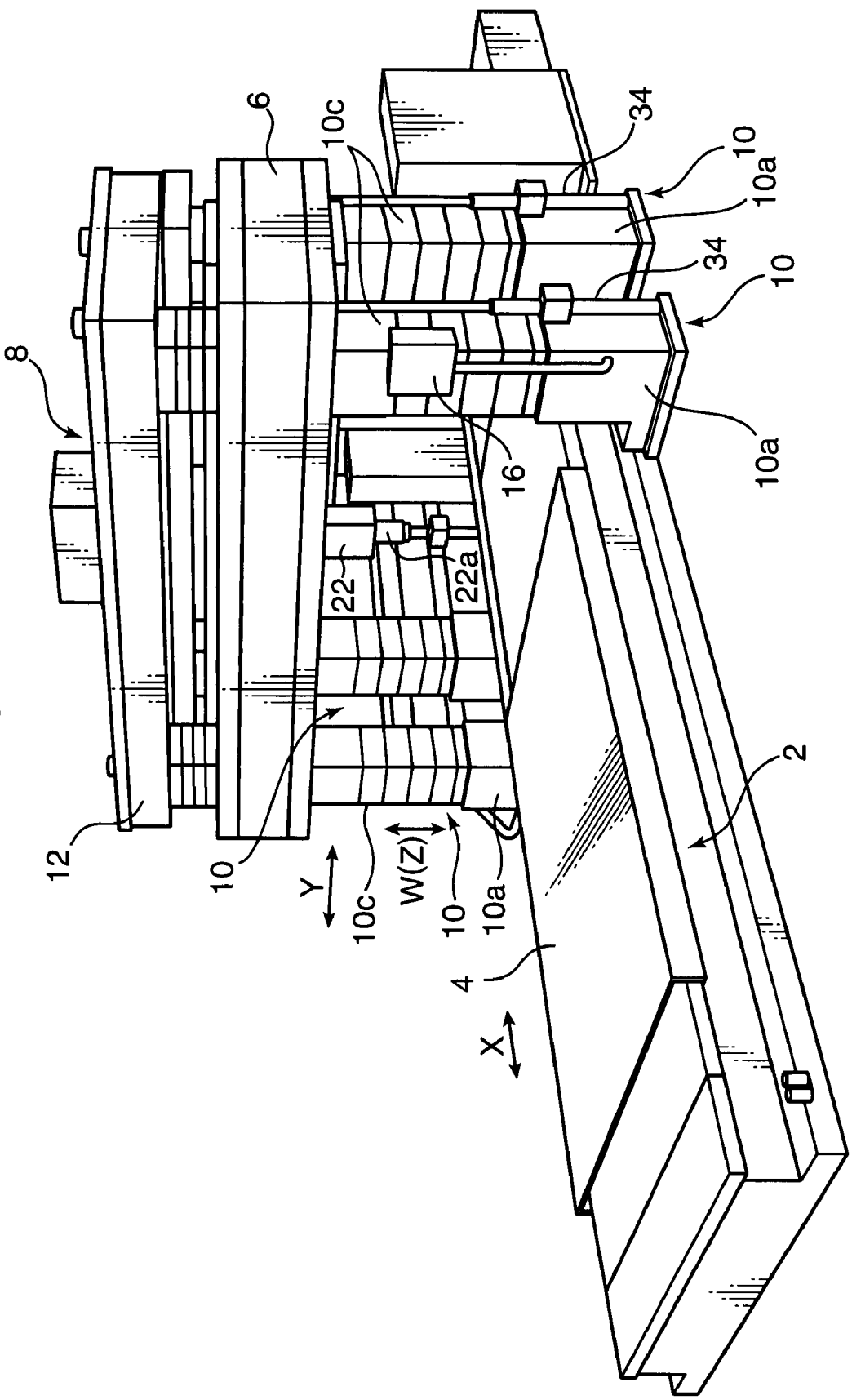
FIG. 1 is a perspective view of a machine tool according to a preferred embodiment of the invention.

The present invention is now described in detail, by way of example, with reference to the accompanying drawings.

Referring to FIGS. 1 to 9, a machine tool according to a preferred embodiment of the invention is described hereunder.

The machine tool of the preferred embodiment is a machine for shaping a workpiece through a cutting process performed by moving a cutting tool relative to the workpiece while rotating the cutting tool. As shown in FIGS. 1 to 4, the machine tool includes a bed 2, a table 4, a cross rail 6, a main spindle unit 8, a plurality of column units 10, a cross beam 12, a plurality of supportive transfer mechanisms 14 and a control unit 16.

Figure 5:
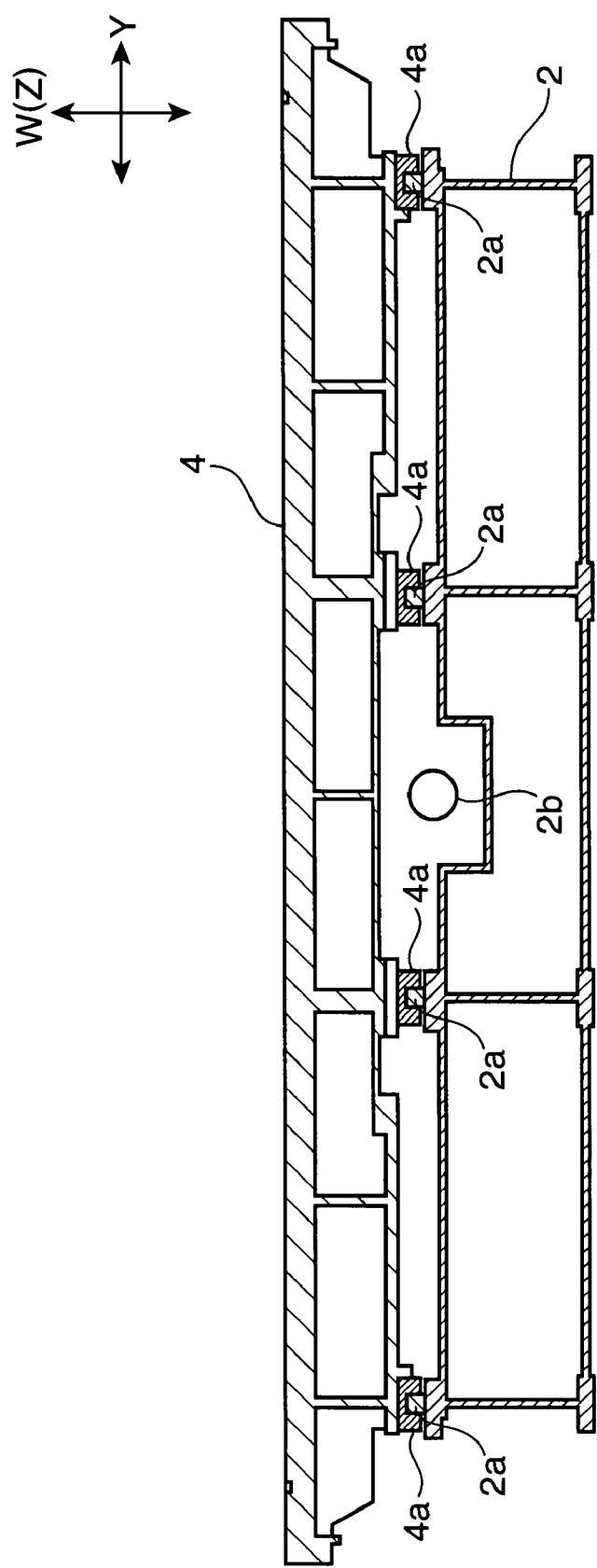
FIG. 5 is a cross-sectional view of a bed and a table of the machine tool of FIG. 1 taken along a Y-axis.

The bed 2 is mounted on a specific installation surface and a plurality of guide rails 2a for guiding the table 4 are mounted on a top surface of the bed 2. Specifically, four guide rails 2a are mounted in parallel as shown in FIG. 5. The four guide rails 2a extend side by side along a longitudinal direction (X-axis) of the bed 2 at specific intervals along a Y-axis which is perpendicular to the longitudinal direction.

The table 4 is mounted on top of the bed 2 and the workpiece is placed on top of the table 4. The table 4 is supported by the bed 2 movably along the X-axis in a horizontal plane as shown in FIG. 1. Specifically, there are provided a plurality of slide blocks 4a on a bottom side of the table 4 as shown in FIG. 5. Located at positions corresponding to the four guide rails 2a, the slide blocks 4a are fitted onto the respective guide rails 2a from above and guided thereby so that the slide blocks 4a can slide along the X-axis. This sliding motion of the slide blocks 4a permits the table 4 to slide on the bed 2 along the X-axis.

Referring to FIG. 5, there is provided a ball screw 2b above the bed 2 for moving the table 4 along the X-axis. Located at a position corresponding to the center of gravity of the table 4, the ball screw 2b extends along the X-axis at right angles to the Y-axis in a horizontal plane. The ball screw 2b is mated with an unillustrated nut unit which is fixed to the table 4 at a position corresponding to the center of gravity of the table 4. Thus, as the ball screw 2b is rotated about its own axis by an unillustrated motor, the ball screw 2b moves the nut unit and the table 4 to which the nut unit is fixed along the X-axis.

Figure 2:
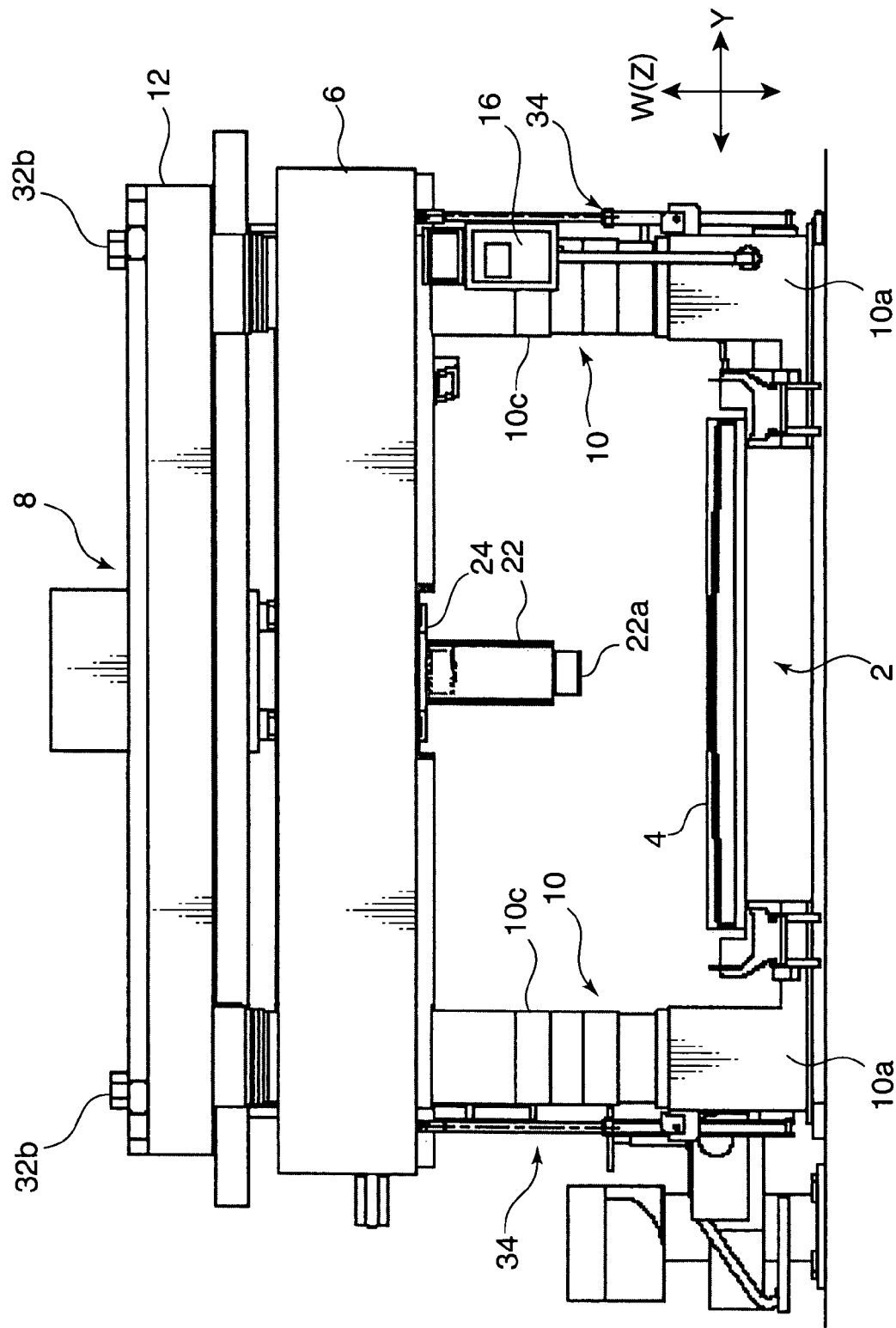
FIG. 2 is a front view of the machine tool of FIG.
Figure 3:
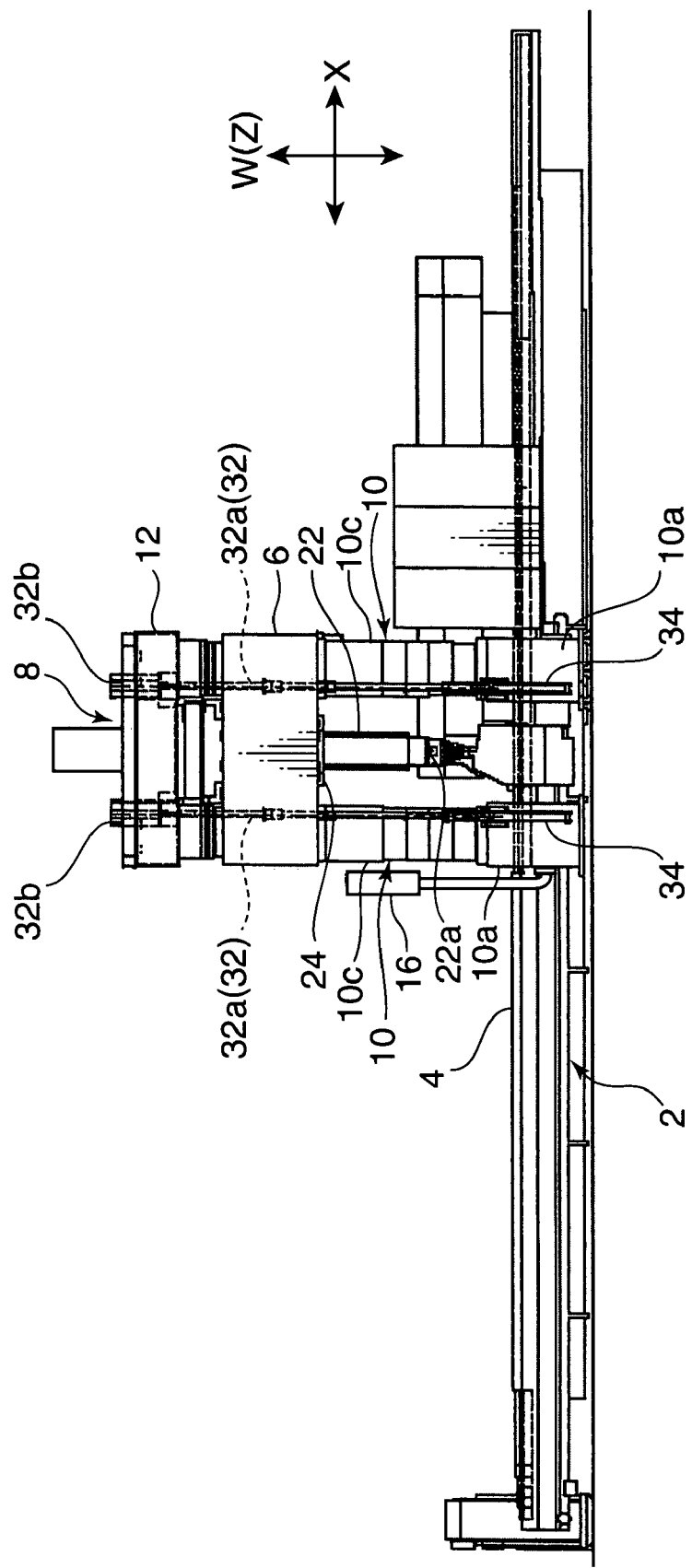
FIG. 3 is a side view of the machine tool of FIG. 1.
Figure 6:
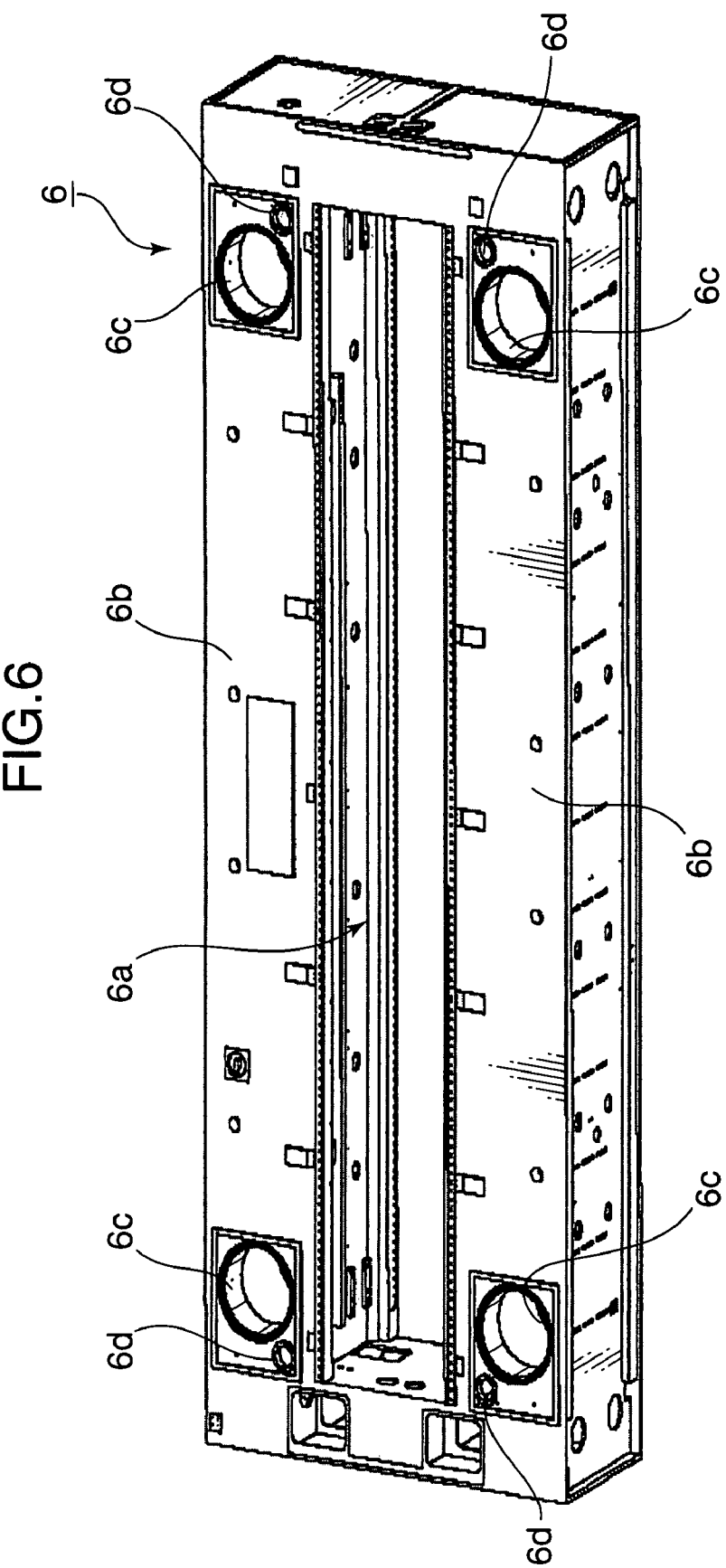
FIG. 6 is a perspective view of a cross rail of the machine tool of FIG. 1.

As shown in FIGS. 1 to 3, the cross rail 6 is a member for supporting the main spindle unit 8 above the table 4 movably along the Y-axis. The cross rail 6 has a boxlike structure which is elongate along the Y-axis with an internal space 6a formed in a central part of the boxlike structure as shown in FIG. 6. The internal space 6a extends along the Y-axis and passes vertically all the way through the cross rail 6.

The cross rail 6 supports the main spindle unit 8 in such a way that the main spindle unit 8 can move along the Y-axis within the internal space 6a of the cross rail 6. The cross rail 6 includes a pair of supporting portions 6b extending along the internal space 6a. Separated by a specific distance along the X-axis, the two supporting portions 6b of the cross rail 6 support front and rear portions of the main spindle unit 8 located frontward and rearward along the X-axis with respect to the center of gravity of the main spindle unit 8, respectively. The supporting portions 6b of the cross rail 6 support the main spindle unit 8 at a position in an imaginary vertical plane passing through the center of gravity of the main spindle unit 8, the imaginary vertical plane dividing the main spindle unit 8 into symmetrical halves along the X-axis.

The cross rail 6 has a plurality of through holes 6c passing therethrough along a direction perpendicular to a top surface of the table 4, or along a vertical direction (hereinafter referred to as a W-axis). In the machine tool of this embodiment, the through holes 6c each have a circular shape in top view and are formed close to four corners of the cross rail 6 at positions located symmetrically along both the X- and Y-axes with respect to the center of gravity of the cross rail 6. Further, the cross rail 6 has built-in nut units 6d located adjacent to the individual through holes 6c. Each having a threaded hole passing through the cross rail 6 along the W-axis, these nut units 6d are formed at positions located symmetrically along both the X- and Y-axes with respect to the center of gravity of the cross rail 6.

Figure 7:
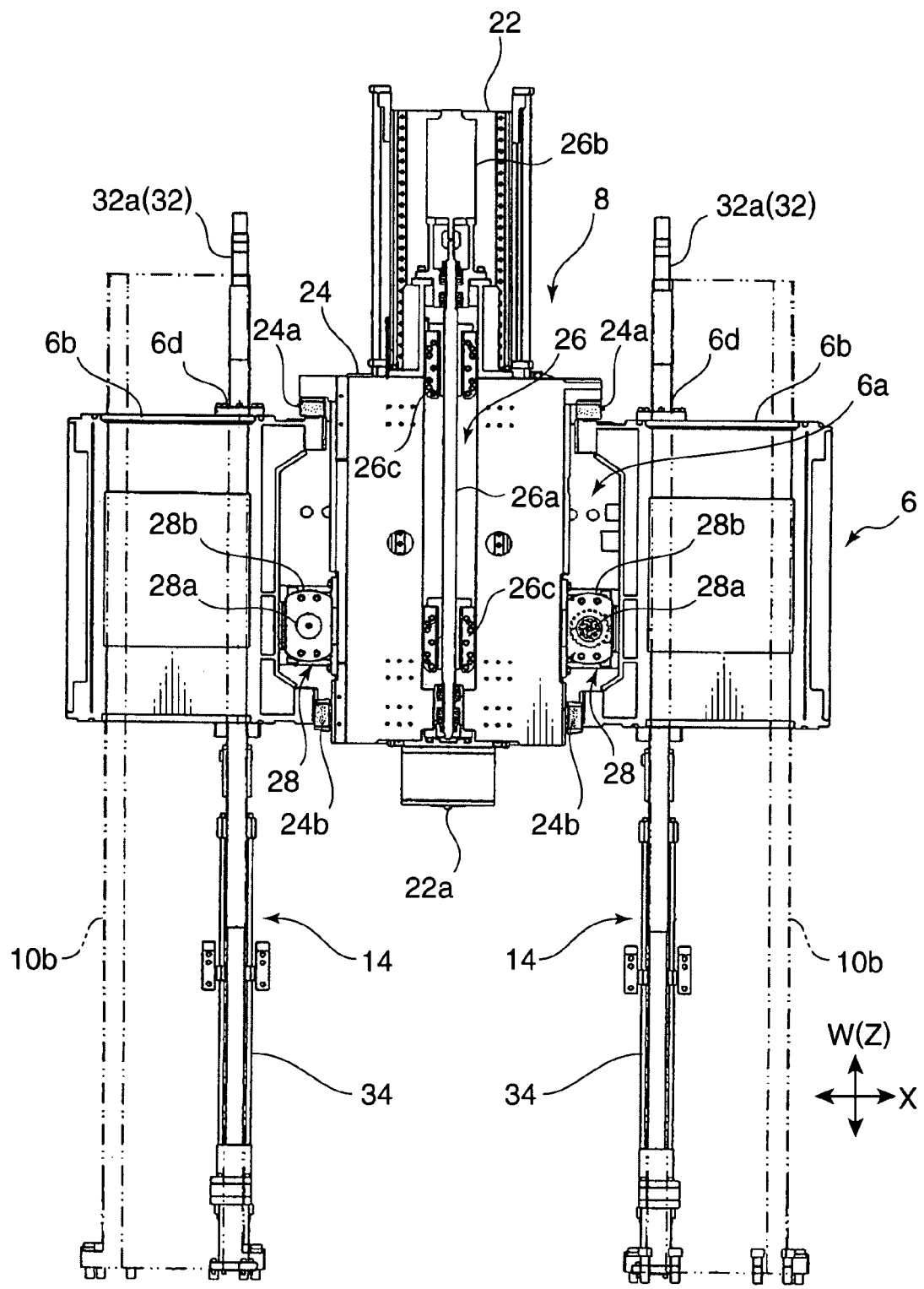
FIG. 7 is a diagram showing the construction of a main spindle unit, saddle driving mechanisms, columns and supportive transfer mechanisms of the machine tool of FIG. 1.

The main spindle unit 8 rotates the cutting tool like a face mill (not shown) which is detachably fitted to the main spindle unit 8. Referring to FIG. 7, the main spindle unit 8 includes a ram 22, a saddle 24, a main spindle shift mechanism 26 and a pair of saddle driving mechanisms 28.

The ram 22 is provided with a main spindle 22a and an unillustrated motor. The main spindle 22a is installed in an upright position so that a central axis thereof is positioned perpendicular to the top surface of the table 4, and the cutting tool is detachably mounted at a lower end of the main spindle 22a. The motor of the ram 22 rotates the main spindle 22a and the cutting tool attached thereto about the central axis. The ram 22 is made movable along the vertical direction, or perpendicularly to the top surface of the table 4. This moving direction of the ram 22, which is parallel to the aforementioned W-axis, is hereinafter referred to as a Z-axis.

The saddle 24 is a member for holding the ram 22 movably along the Z-axis. The saddle 24 has an internal space passing all the way therethrough along the Z-axis. The ram 22 is accommodated in the internal space of the saddle 24 movably along the Z-axis, while the saddle 24 itself is accommodated in the internal space 6a of the cross rail 6 and supported thereby movably along the Y-axis. Referring to FIG. 7, there are provided guiding parts 24a at an upper portion of the saddle 24 on two sides thereof facing oppositely along the X-axis, while there are provided guiding parts 24b at a lower portion of the saddle 24 on the two sides thereof facing oppositely along the X-axis. These guiding parts 24a, 24b slide along the cross rail 6, thereby allowing the saddle 24 to move within the cross rail 6 along the Y-axis.

The aforementioned main spindle shift mechanism 26 serves to move the ram 22 including the main spindle 22a along the Z-axis. The main spindle shift mechanism 26 includes a ball screw 26a extending along the Z-axis and rotatably supported by the saddle 24, a motor 26b for turning the ball screw 26a and a plurality of nut units 26c which are fixed to the ram 22 with the ball screw 26a passing through threaded holes of the nut units 26c. As the motor 26b rotates the ball screw 26a about its own axis, the ball screw 26a moves the nut units 26c, the ram 22 to which the nut units 26c are fixed and the main spindle 22a along the Z-axis relative to the saddle 24.

The aforementioned pair of saddle driving mechanisms 28 serves to move the saddle 24 along the Y-axis. The two saddle driving mechanisms 28 are installed at symmetrical positions located frontward and rearward along the X-axis with respect to the center of gravity of the main spindle unit 8 to laterally move the saddle 24.

Each of the saddle driving mechanisms 28 is installed between a side surface of the saddle 24 facing the forward or backward direction of the X-axis and one of inside surfaces of the cross rail 6 surrounding the internal space 6a thereof. Each of the saddle driving mechanisms 28 includes a ball screw 28a, a nut unit 28b and an unillustrated motor. The ball screw 28a of each saddle driving mechanism 28 is fixed to one of the inside surfaces of the cross rail 6 in such a manner that the ball screw 28a extending along the Y-axis can rotate about its own axis. The nut unit 28b of each saddle driving mechanism 28 is fixed to one side surface of the saddle 24 facing the forward or backward direction of the X-axis with the corresponding ball screw 28a passing through a threaded hole of the nut unit 28b. As the ball screws 28a are rotated by the motor of each saddle driving mechanism 28, the ball screws 28a move the respective nut units 28b therealong to shift the main spindle unit 8 including the saddle 24 along the Y-axis.

The machine tool of the present embodiment is provided with four column units 10 which are installed in an upright position in two pairs at positions on opposite sides (left and right) with the bed 2 and the table 4 located in between along the Y-axis as shown in FIG. 1. Each of these column units 10 includes a column base 10a, a column 10b and a column cover 10c. The column bases 10a of the individual column units 10 are mounting bases thereof which are installed on the earlier-mentioned installation surface and fixed to side surfaces of the bed 2.

Figure 4:
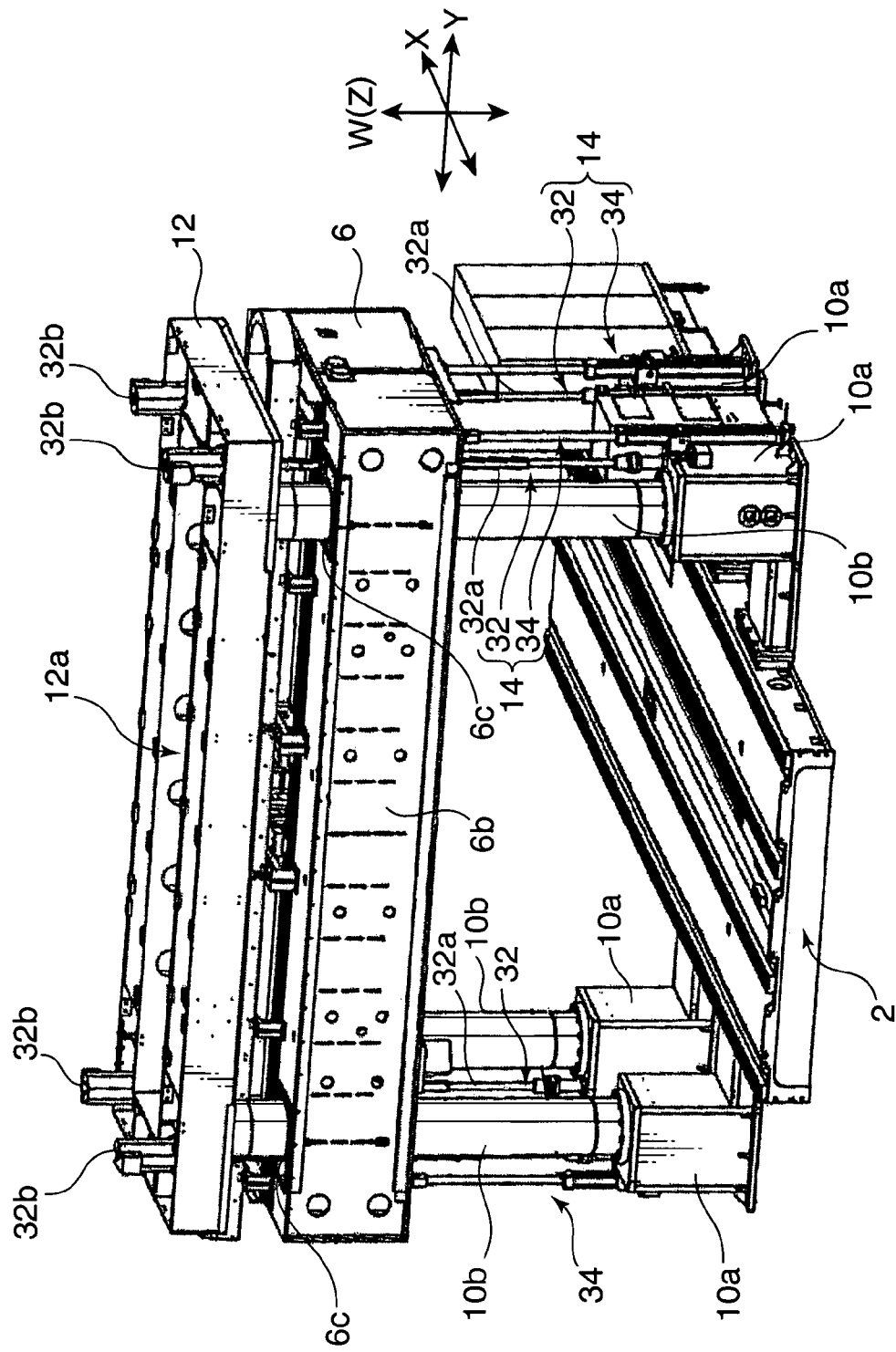
FIG. 4 is a perspective view of the machine tool of FIG. 1 with outer fittings removed therefrom.

As illustrated in FIG. 4, the columns 10b of the four column units 10 are erected in the upright position on the respective column bases 10a to guide the cross rail 6 vertically along the W-axis. The individual columns 10b are located at positions corresponding to the through holes 6c formed in the cross rail 6. The columns 10b arranged on each side (left and right) adjacent to each other along the X-axis are located on front and rear sides symmetrically with respect to the centers of gravity of the cross rail 6 and the main spindle unit 8. Similarly, the columns 10b disposed on the opposite sides (left and right) of the table 4 along the Y-axis are at the aforementioned left and right positions which are located symmetrically with respect to the center of gravity of the cross rail 6. The main spindle unit 8 can be moved along the Y-axis between the two pairs of columns 10b on the opposite sides of the table 4 within an area between the front and rear columns 10b. The columns 10b each have a circular cross section in top view and are passed along the W-axis all the way through the respective through holes 6c formed in the cross rail 6. With this arrangement, the cross rail 6 is guided by the four columns 10b up and down along the W-axis.

Outer cylindrical surfaces of the columns 10b of the four column units 10 are covered by the respective column covers 10c.

Top ends of the columns 10b are joined together as the cross beam 12 is mounted onto the top ends of the four columns 10b as shown in FIG. 4. The cross beam 12 has a boxlike structure which is elongate along the Y-axis with an internal space 12a formed in a central part of the boxlike structure. This internal space 12a extends along the Y-axis and passes through the cross beam 12 all the way along the vertical direction (W-axis).

Figure 8:
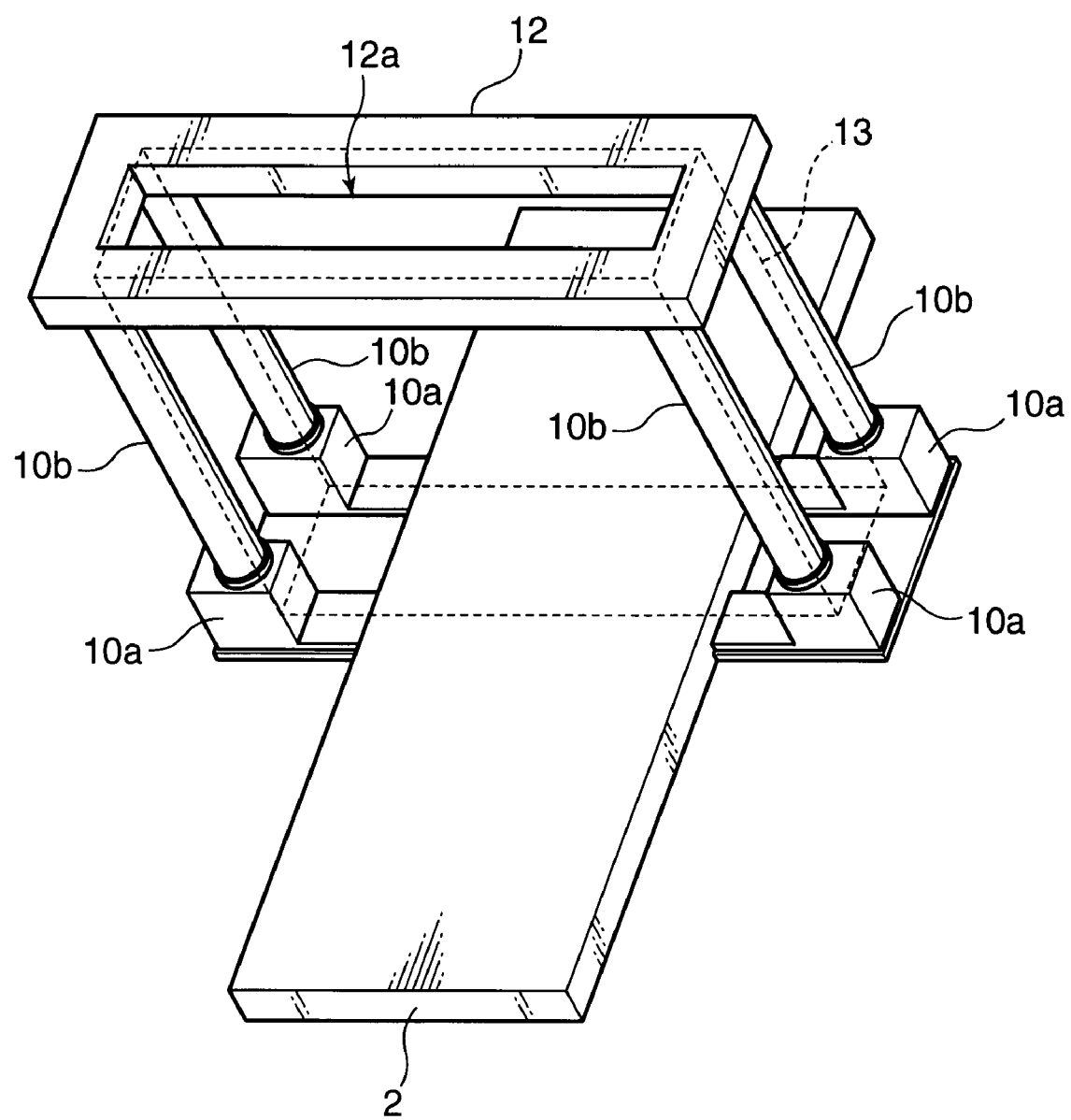
FIG. 8 is a diagram for explaining advantages of a structure including the bed, column bases, the columns and the cross rail of the machine tool of FIG. 1.

The bed 2, the column bases 10a, the columns 10b and the cross beam 12 together constitute a structural body which forms a closed loop 13 of forces passing through the bed 2 up to the cross beam 12 as shown in FIG. 8. This structure creates high stiffness, making it possible to provide stable accuracy of movements of individual machine components and to easily prevent deformation and changes in posture of the cross rail 6 caused by movement of the main spindle unit 8.

As shown in FIG. 4, the aforementioned supportive transfer mechanisms 14 are individually positioned beside the four columns 10b to move the cross rail 6 up and down along the W-axis while supporting the cross rail 6. This means that the machine tool of the present embodiment is provided with four supportive transfer mechanisms 14 which are arranged in two pairs at positions on opposite sides (left and right) of the table 4 facing each other along the Y-axis. The supportive transfer mechanisms 14 installed on each side of the table 4 are separated by a specific distance from each other along the X-axis. The two pairs of supportive transfer mechanisms 14 disposed on the left and right sides of the table 4 respectively support left and right portions of the cross rail 6 which are located symmetrically about the center of gravity thereof. Also, the supportive transfer mechanisms 14 installed on each side adjacent to each other along the X-axis respectively support front and rear portions of the cross rail 6 which are located symmetrically about the center of gravity thereof. Thus, the supportive transfer mechanisms 14 disposed on the left and right sides of the table 4 include the front-side supportive transfer mechanisms 14 for supporting the front portion of the cross rail 6 and the rear-side supportive transfer mechanisms 14 for supporting the rear portion of the cross rail 6.

Each of the supportive transfer mechanisms 14 includes a driving device 32 and a balancing cylinder 34. The driving device 32 is erected on each column base 10a and accommodated within the column cover 10c under conditions where each column base 10a is covered by the column cover 10c. The driving devices 32 of the individual supportive transfer mechanisms 14 are installed at positions located symmetrically along both the X- and Y-axes with respect to the center of gravity of the cross rail 6.

Each of the driving devices 32 includes a ball screw 32a and a motor 32b for driving the ball screw 32a. The ball screws 32a of the individual driving devices 32 are passed through the threaded holes of the corresponding nut units 6d formed in the cross rail 6. The motors 32b of the driving devices 32 are mounted on top of the cross beam 12 and connected to upper ends of the individual ball screws 32a. These motors 32b move the cross rail 6 including the nut units 6d up and down along the W-axis by turning the respective ball screws 32a. The individual driving devices 32 serve also to bear a load applied to the cross rail 6 to a certain extent.

The balancing cylinders 34 of the individual supportive transfer mechanisms 14 are installed at positions located symmetrically along both the X- and Y-axes with respect to the center of gravity of the cross rail 6. The balancing cylinders 34 are installed in an upright position to extend along the W-axis. Lower ends of the balancing cylinders 34 are fixed to side surfaces of the individual column bases 10a while upper ends of the balancing cylinders 34 are fixed to a bottom side of the cross rail 6.

The individual balancing cylinders 34 are essentially hydraulic cylinders which support a specific proportion of a load applied by the cross rail 6 at all times. More specifically, the load applied downward by the cross rail 6 is distributed to and born by the four balancing cylinders 34 and the driving devices 32.

Figure 9:
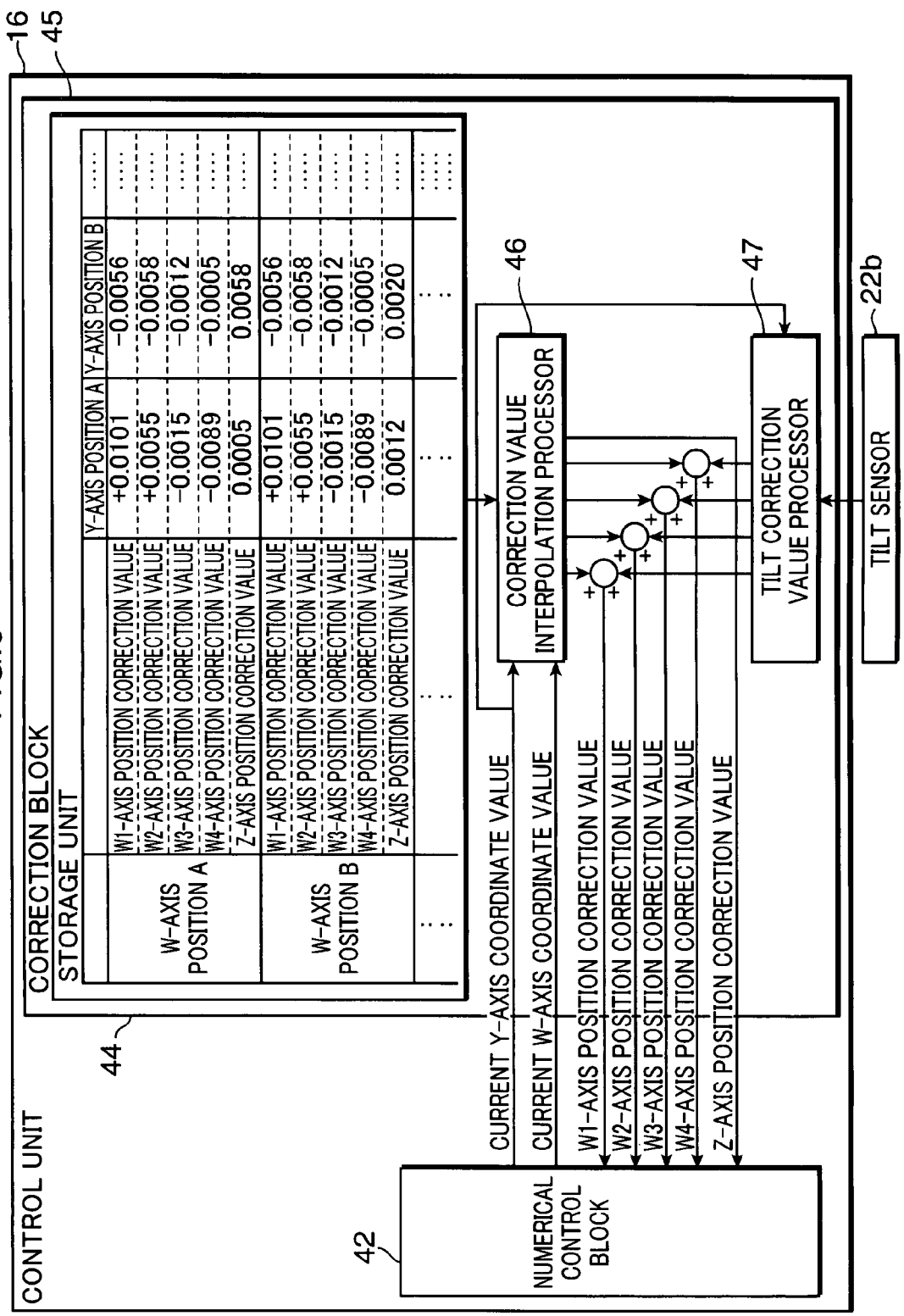
FIG. 9 is a block diagram for explaining functions of a control unit of the machine tool of the preferred embodiment.

The aforementioned control unit 16 serves to control individual components of the machine tool of the present embodiment. The control unit 16 includes a numerical control block (controller) 42 and a correction block 44 as shown in FIG. 9.

The numerical control block 42 controls the amount of movement produced by the driving device 32 of each supportive transfer mechanism 14 as well as the amount of movement of the main spindle 22a produced by the main spindle shift mechanism 26 by a computerized numerical control (CNC) technique.

The correction block 44 determines W1- to W4-axis position correction values and a Z-axis stroke value and gives these values to the numerical control block 42. The W1- to W4-axis position correction values define the amounts of movements of individual parts of the cross rail 6 to be produced by the driving devices 32 of the individual supportive transfer mechanisms 14 to make up for a change in posture of the cross rail 6 for keeping the main spindle 22a perpendicular to the top surface of the table 4. On the other hand, the Z-axis stroke value defines the amount of movement of the main spindle unit 8 to be produced by the main spindle shift mechanism 26 to make up for a deviation of the distance between a cutting edge of the cutting tool attached to the main spindle 22a and the top surface of the table 4 from a predefined value.

The numerical control block 42 keeps the main spindle 22a perpendicular to the top surface of the table 4 by controlling the amounts of movements of the individual parts of the cross rail 6 produced by the driving devices 32 of the four supportive transfer mechanisms 14 based on the W1- to W4-axis position correction values given from the correction block 44. Also, the numerical control block 42 makes up for the deviation of the distance between the cutting edge of the cutting tool and the top surface of the table 4 from the predefined value by controlling the amount of movement of the main spindle 22*a* produced by the main spindle shift mechanism 26 based on the Z-axis stroke value given from the correction block 44.

When the main spindle unit 8 moves along the Y-axis, for example, a proportion of a load (weight) applied on one side (left or right) toward which the main spindle unit 8 moves would increase. This lateral movement of the main spindle unit 8 may potentially cause tilting of both the cross rail 6 and the main spindle unit 8. If the main spindle unit 8 becomes aslant, the main spindle 22*a* also slants away from the upright position with respect to the top surface of the table 4. The numerical control block 42 separately controls the amounts of movements of the individual parts of the cross rail 6 produced along the W-axis by the driving devices 32 of the four supportive transfer mechanisms 14 to make up for a change in posture of the cross rail 6 caused by movement of the main spindle unit 8 along the Y-axis. In this way, the numerical control block 42 keeps the main spindle 22*a* perpendicular to the top surface of the table 4. At this point, the numerical control block 42 obtains a Y-axis coordinate value of the current position of the main spindle unit 8 from the saddle driving mechanisms 28 as well as W-axis coordinate values of the individual parts of the cross rail 6 which are driven by the driving devices 32 of the four supportive transfer mechanisms 14 from the individual driving devices 32.

The correction block 44 includes a storage unit 45, a correction value interpolation processor 46 and a tilt correction value processor 47.

The storage unit 45 stores specific correction data which includes information about the amounts of movements (W1- to W4-axis position correction values) of the individual parts of the cross rail 6 to be produced by the driving devices 32 of the individual supportive transfer mechanisms 14 for keeping the main spindle 22*a* perpendicular to the top surface of the table 4 when the main spindle unit 8 is moved along the Y- and W-axes. The aforementioned amounts of movements of the individual parts of the cross rail 6 stored in the storage unit 45 are determined by actual measurements obtained from an experiment performed in advance by laterally moving the main spindle unit 8 to individual positions (Y-axis position A, Y-axis position B, etc.) along the Y-axis. The correction data stored in the storage unit 45 for the individual positions of the main spindle unit 8 along the Y-axis further includes the amounts of movements of the individual parts of the cross rail 6 determined by actual measurements obtained from an experiment performed in advance by vertically moving the main spindle unit 8 to individual positions (W-axis position A, W-axis position B, etc.) along the W-axis.

Upon receiving information about the Y-axis coordinate value of the current position of the main spindle unit 8 and a W-axis coordinate value thereof from the numerical control block 42, the correction value interpolation processor 46 calculates W1- to W4-axis position correction values corresponding to the Y- and the W-axis coordinate values of the current position of the main spindle unit 8 based on the input information and the correction data stored in the storage unit 45. If the current Y-axis coordinate value of the main spindle unit 8 is the coordinate value of a position existing between two adjacent positions along the Y-axis contained in the correction data, the correction value interpolation processor 46 calculates the W1- to W4-axis position correction values for the current Y-axis coordinate value by interpolating the W1- to W4-axis position correction values for the two adjacent positions along the Y-axis stored in the storage unit 45. Similarly, if the current W-axis coordinate value of the main spindle unit 8 is the coordinate value of a position existing between two adjacent positions along the W-axis contained in the correction data, the correction value interpolation processor 46 calculates the W1- to W4-axis position correction values for the current W-axis coordinate value by interpolating the W1- to W4-axis position correction values for the two adjacent positions along the W-axis stored in the storage unit 45.

The main spindle 22*a* is provided with a tilt sensor 22*b* for detecting inclination of the main spindle 22*a* relative to the top surface of the table 4. The tilt sensor 22*b* delivers data on the inclination of the main spindle 22*a* to the tilt correction value processor 47 of the correction block 44. The aforementioned Y-axis coordinate value of the current position of the main spindle unit 8 is also input from the numerical control block 42 into the tilt correction value processor 47. The tilt correction value processor 47 calculates W1- to W4-axis position correction values necessary for keeping the main spindle 22*a* perpendicular to the top surface of the table 4 based on the data on the inclination of the main spindle 22*a* and the Y-axis coordinate value of the current position of the main spindle unit 8.

The correction block 44 calculates the W1- to W4-axis position correction values used for actual correction by adding respectively the W1- to W4-axis position correction values determined by the correction value interpolation processor 46 and the W1- to W4-axis position correction values determined by the tilt correction value processor 47 and delivers the W1- to W4-axis position correction values thus calculated to the numerical control block 42. The numerical control block 42 controls the amounts of movements of the individual parts of the cross rail 6 produced by the driving devices 32 of the four supportive transfer mechanisms 14 based on the W1- to W4-axis position correction values input from the correction block 44. Through this control operation, the numerical control block 42 makes up for a change in posture of the cross rail 6 and keeps the main spindle 22*a* perpendicular to the top surface of the table 4. The aforementioned correction made in accordance with the inclination of the main spindle 22*a* detected by the tilt sensor 22*b* serves to make up for an unexpected inclination of the main spindle 22*a* caused by a deforming behavior of the columns 10*b*, the cross rail 6 or other structural members due to a temperature change, for instance.

The aforementioned approach to making up for the change in posture of the cross rail 6 by controlling the amounts of movements of the individual parts of the cross rail 6 produced by the driving devices 32 of the four supportive transfer mechanisms 14 may possibly cause a slight vertical displacement of the main spindle unit 8, producing a deviation of the distance between the cutting edge of the cutting tool and the top surface of the table 4 from the predefined value. In the present embodiment, however, the numerical control block 42 adjusts the position of the main spindle 22*a* along the Z-axis by controlling the amount of movement of the main spindle 22*a* produced by the main spindle shift mechanism 26 to make up for any deviation of the distance between the cutting edge of the cutting tool and the top surface of the table 4 from the predefined value potentially caused by correcting for the change in posture of the cross rail 6.

Specifically, the amount of movement of the main spindle 22*a* along the Z-axis necessary for adjusting the distance between the cutting edge of the cutting tool and the top surface of the table 4 to match the predefined value upon correcting for the change in posture of the cross rail 6 is measured in advance with the main spindle unit 8 moved to the aforementioned individual positions (W-axis position A, W-axis position B, etc.) along the W-axis and to the aforementioned individual positions (Y-axis position A, Y-axis position B, etc.) along the Y-axis, and data on the amount of movement of the main spindle 22a along the Z-axis measured at each of these positions is stored in the storage unit 45. In addition, the correction value interpolation processor 46 calculates the amount of movement of the main spindle 22a along the Z-axis required to cancel out the deviation of the distance between the cutting edge of the cutting tool and the top surface of the table 4 from the predefined value based on the Y- and the W-axis coordinate values of the current position of the main spindle unit 8 fed from the numerical control block 42 and the data on the amount of movement of the main spindle 22a along the Z-axis stored in the storage unit 45. The correction value interpolation processor 46 delivers the amount of movement of the main spindle 22a along the Z-axis thus calculated to the numerical control block 42. The numerical control block 42 controls the amount of movement of the main spindle 22a along the Z-axis produced by the main spindle shift mechanism 26 based on input data and thereby cancels out the deviation of the distance between the cutting edge of the cutting tool and the top surface of the table 4 from the predefined value caused by correcting for the change in posture of the cross rail 6.

Furthermore, the numerical control block 42 has a capability to tilt the cross rail 6 in such a way that a downstream portion of the cross rail 6 located downstream along a feed direction of the table 4 becomes higher than an upstream portion of the cross rail 6 located upstream along the feed direction of the table 4 by separately controlling the amounts of movements of the individual parts of the cross rail 6 produced by the driving devices 32 of the individual supportive transfer mechanisms 14. If the cutting tool is positioned such that a downstream side of the cutting tool opposite to an upstream side thereof which first goes into contact with the workpiece is located lower than the upstream side of the cutting tool even by a slight amount, the downstream side of the cutting tool may contact and damage an already cut part of a work surface. Contrary to this, if the numerical control block 42 tilts the cross rail 6 in such a way that the downstream portion of the cross rail 6 becomes higher than the upstream portion thereof along the feed direction of the table 4 as mentioned above, the cutting tool is positioned such that the downstream side of the cutting tool opposite to the upstream side thereof which first goes into contact with the workpiece is slightly lifted. Consequently, the downstream portion of the cutting tool is kept from contacting the already cut part of the work surface.

As thus far discussed, the machine tool of the present embodiment is constructed such that the columns 10b for guiding the cross rail 6 vertically along the W-axis are erected in two pairs on the opposite sides of the table 4 symmetrically on the front and rear sides along the X-axis with respect to the center of gravity of the main spindle unit 8. Therefore, the main spindle unit 8 moves under conditions where the center of gravity of the main spindle unit 8 is located between the two columns 10b on the front side and the other two columns 10b on the rear side. This arrangement makes it possible to prevent deformation and changes in posture of the cross rail 6 due to movement of the main spindle unit 8 as well as tilting and displacement of the main spindle 22a of the main spindle unit 8 supported by the cross rail 6 without increasing the cross-sectional area of each column 10b. Consequently, the aforementioned arrangement of the embodiment serves to prevent tilting and displacement of the cutting tool attached to the main spindle 22a and, thus, a reduction in work-machining accuracy of the cutting tool. It will be appreciated from the foregoing discussion that the machine tool of the present embodiment can prevent deformation and changes in posture of the cross rail 6 with a slim structure as well as a reduction in work-machining accuracy due to such deformation and changes in posture of the cross rail 6.

Furthermore, the machine tool of the foregoing embodiment is constructed such that the two supporting portions 6b of the cross rail 6 support the front and rear portions of the main spindle unit 8 located frontward and rearward along the X-axis with respect to the center of gravity of the main spindle unit 8, respectively. This arrangement makes it possible to prevent the main spindle unit 8 from leaning by its own weight in one direction along the X-axis. Thus, the arrangement of the embodiment serves to further prevent the occurrence of tilting and displacement of the cutting tool attached to the main spindle 22a of the main spindle unit 8, yet improving the work-machining accuracy.

Furthermore, the machine tool of the foregoing embodiment is constructed such that the two pairs of supportive transfer mechanisms 14 disposed on the left and right sides of the table 4 along the Y-axis respectively support the left and right portions of the cross rail 6 which are located symmetrically about the center of gravity thereof, whereas the supportive transfer mechanisms 14 installed on each side adjacent to each other along the X-axis respectively support the front and rear portions of the cross rail 6 which are located symmetrically about the center of gravity thereof. With this arrangement, the four supportive transfer mechanisms 14 can move the cross rail 6 up and down in good balance. Therefore, the supportive transfer mechanisms 14 can move the cross rail 6 and the main spindle unit 8 in a stable posture along the W-axis.

Furthermore, the numerical control block 42 of the machine tool of the foregoing embodiment separately controls the amounts of movements of the individual parts of the cross rail 6 along the W-axis produced by the driving devices 32 of the individual supportive transfer mechanisms 14 as mentioned earlier. In this way, the numerical control block 42 makes up for a change in posture of the cross rail 6 caused by movement of the main spindle unit 8 along the Y-axis, keeps the main spindle 22a perpendicular to the top surface of the table 4, and thereby makes a correction for tilting of the cutting tool caused by the movement of the main spindle unit 8 along the Y-axis. This control operation of the numerical control block 42 makes it possible to prevent a reduction in work-machining accuracy due to the movement of the main spindle unit 8 along the Y-axis.

Furthermore, the numerical control block 42 of the machine tool of the foregoing embodiment separately controls the amounts of movements of the individual parts of the cross rail 6 produced by the driving devices 32 of the individual supportive transfer mechanisms 14 based on the data on inclination of the main spindle 22a relative to the top surface of the table 4 detected by the tilt sensor 22b. This permits the numerical control block 42 to make up for a change in posture of the cross rail 6 and keep the main spindle 22a perpendicular to the top surface of the table 4. With this arrangement, the numerical control block 42 continuously monitors the main spindle 22a for any tilting relative to the top surface of the table 4 with the aid of the tilt sensor 22b and instantly makes a correction for tilting of the main spindle 22a, if any. This control operation of the numerical control block 42 makes it possible to keep the main spindle 22a perpendicular to the top surface of the table 4 and maintain high machining accuracy during a process of machining the workpiece.

Furthermore, the numerical control block 42 of the machine tool of the foregoing embodiment can adjust the position of the main spindle 22a along the Z-axis by controlling the amount of movement of the main spindle 22a produced by the main spindle shift mechanism 26. This capability of the numerical control block 42 makes it possible to correct for a deviation of the distance between the cutting edge of the cutting tool and the top surface of the table 4 from the predefined value potentially caused by compensating for a change in posture of the cross rail 6. This capability in effect serves to prevent a reduction in work-machining accuracy caused by compensating for the change in posture of the cross rail 6.

Furthermore, the numerical control block 42 of the machine tool of the foregoing embodiment has the capability to tilt the cross rail 6 in such a way that the downstream portion of the cross rail 6 located downstream along the feed direction of the table 4 becomes higher than the upstream portion of the cross rail 6 located upstream along the feed direction of the table 4 by separately controlling the amounts of movements of the individual parts of the cross rail 6 produced by the driving devices 32 of the individual supportive transfer mechanisms 14. This capability of the numerical control block 42 makes it possible to position the downstream side of the cutting tool opposite to the upstream side thereof which first goes into contact with the workpiece higher than the upstream portion of the cutting tool and thereby prevent the downstream side thereof from contacting and damaging the already cut part of the work surface. This capability of the numerical control block 42 to prevent a contact between the downstream side of the cutting tool and the already cut part of the work surface serves to reduce contact time between the cutting tool and the workpiece, contributing eventually to retardation of the progress of wear of the cutting tool and prolongation of the useful life thereof.

While the invention has thus far been described with reference to the preferred embodiment thereof, the aforementioned arrangement of the embodiment should be construed as being simply illustrative and not limiting the invention. The scope of the invention is shown solely by the appended claims, and not by the foregoing embodiment. It is to be understood that the invention is intended to cover the appended claims as well as all possible modifications of the embodiment and equivalents thereof which may occur to those skilled in the art within the spirit and scope of the invention.

Although the control unit 16 of the machine tool of the foregoing embodiment determines the W1- to W4-axis position correction values used for actual correction by adding respectively the W1- to W4-axis position correction values of the correction data stored in the storage unit 45 based on measurements obtained in advance and the W1- to W4-axis position correction values calculated based on the data on the inclination of the main spindle 22a fed from the tilt sensor 22b as previously discussed, the invention is not limited to this arrangement. The embodiment may be modified such that the control unit 16 uses only the W1- to W4-axis position correction values of the correction data stored in the storage unit 45 or the W1- to W4-axis position correction values calculated based on the data on the inclination of the main spindle 22a fed from the tilt sensor 22b as the W1- to W4-axis position correction values used for actual correction, for example.

Furthermore, the columns 10b and the through holes 6c need not necessarily have circular cross sections in top view. Instead, the columns 10b and the through holes 6c may be square-shaped in horizontal cross section, for example.

Moreover, the portions of the cross rail 6 supported by the individual supportive transfer mechanisms 14 are not limited to those discussed earlier with reference to the foregoing embodiment. For example, the embodiment of the present invention may be modified such that the machine tool is provided with only two supportive transfer mechanisms which are arranged on both sides (left and right) of the table 4 facing each other along the Y-axis and the two supportive transfer mechanisms support the left and right portions of the cross rail 6 which are located symmetrically about the center of gravity thereof.

In summary, a machine tool of the present invention for machining a workpiece by moving a cutting tool relative to the workpiece while rotating the cutting tool includes a table, a main spindle unit, a cross rail, a plurality of columns and a supportive transfer system. The table is configured to be movable along a specific feed direction in a horizontal plane with the workpiece placed on a top surface of the table. The main spindle unit includes a main spindle for rotating the cutting tool attached thereto with the main spindle positioned perpendicular to the top surface of the table, the main spindle unit being configured to be movable along a moving direction perpendicular to the feed direction of the table in a horizontal plane above the table. The cross rail supports the main spindle unit in such a manner that the main spindle unit can move along the aforementioned moving direction perpendicular to the feed direction of the table in the horizontal plane. The plurality of columns vertically guide the cross rail, the columns being erected at positions on opposite sides of the table along the moving direction of the main spindle unit and the columns being located on front and rear sides of the center of gravity of the main spindle unit along the feed direction of the table. The supportive transfer system vertically moves the cross rail while supporting the cross rail. The cross rail has a pair of supporting portions for supporting front and rear portions of the main spindle unit located frontward and rearward along the feed direction of the table with respect to the center of gravity of the main spindle unit, respectively, and a plurality of through holes through which the aforementioned columns are passed vertically. The columns passed through the respective through holes support the cross rail movably up and down.

In this machine tool of the invention, the columns for vertically guiding the cross rail are located on the front and rear sides of the center of gravity of the main spindle unit along the feed direction of the table, so that the main spindle unit moves under conditions where the center of gravity of the main spindle unit is located between the columns on the front side and the columns on the rear side along the feed direction of the table. This arrangement makes it possible to prevent deformation and changes in posture of the cross rail due to movement of the main spindle unit as well as tilting and displacement of the main spindle of the main spindle unit supported by the cross rail without increasing the cross-sectional area of each column. Consequently, the aforementioned arrangement of the invention serves to prevent tilting and displacement of the cutting tool attached to the main spindle and, thus, a reduction in work-machining accuracy of the cutting tool caused by the tilting and displacement thereof. In conclusion, the machine tool of the invention can prevent deformation and changes in posture of the cross rail with a slim structure as well as a reduction in work-machining accuracy due to such deformation and changes in posture of the cross rail.

Furthermore, the machine tool of the invention is constructed such that the two supporting portions of the cross rail support the front and rear portions of the main spindle unit located frontward and rearward along the feed direction of the table with respect to the center of gravity of the main spindle unit, respectively. This arrangement makes it possible to prevent the main spindle unit from leaning by its own weight along feed direction of the table. Thus, the arrangement of the invention serves to further prevent the occurrence of tilting and displacement of the cutting tool attached to the main spindle of the main spindle unit as well as a reduction in work-machining accuracy due to the tilting and displacement of the cutting tool.

In one feature of the invention, the aforementioned machine tool is constructed such that the columns each have a circular cross section in top view and the through holes each have a circular shape in top view to allow the columns to pass through.

Preferably, the machine tool of the invention is constructed such that the aforementioned supportive transfer system includes front-side supportive transfer mechanisms and rear-side supportive transfer mechanisms which are installed at positions on both left and right sides of the moving direction of the main spindle unit with the table positioned in between, the front- and rear-side supportive transfer mechanisms disposed on each side of the table being separated by a specific distance from each other along the feed direction of the table. In the machine tool thus constructed, the front- and rear-side supportive transfer mechanisms installed on the left side of the table support a portion of the cross rail located to the left of the center of gravity thereof, whereas the front- and rear-side supportive transfer mechanisms installed on the right side of the table support a portion of the cross rail located to the right of the center of gravity thereof. Also, the front-side supportive transfer mechanisms support a portion of the cross rail located to the front of the center of gravity thereof, whereas the rear-side supportive transfer mechanisms support a portion of the cross rail located to the rear of the center of gravity thereof.

In this machine tool, the supportive transfer mechanisms can move the cross rail up and down in good balance. This means that the supportive transfer mechanisms can move the cross rail and the main spindle unit up and down in a stable posture.

More preferably, the machine tool further includes a controller for controlling movement of the cross rail produced by the supportive transfer mechanisms, the controller having a capability to separately control the amounts of vertical movements of individual parts of the cross rail produced by the individual supportive transfer mechanisms to make up for a change in posture of the cross rail caused by movement of the main spindle unit in order thereby to keep the main spindle perpendicular to the top surface of the table.

The machine tool thus constructed can further prevent a reduction in work-machining accuracy due to tilting of the cutting tool. When the main spindle unit moves in a direction perpendicular to the feed direction of the table, the center of gravity of a structural body including the main spindle unit and the cross rail is displaced toward the direction in which the main spindle unit has moved, causing the cutting tool attached to the main spindle of the main spindle unit to tilt. In this machine tool, the controller makes up for the change in posture of the cross rail caused by the movement of the main spindle unit to keep the main spindle perpendicular to the top surface of the table. The controller makes up for the tilting of the cutting tool attached to the main spindle in this way, making it possible to prevent a reduction in work-machining accuracy caused by the movement of the main spindle unit in the direction perpendicular to the feed direction of the table.

More preferably, the machine tool further includes a storage unit storing correction data which includes premeasured values of the amounts of movements of the individual parts of the cross rail to be produced by the individual supportive transfer mechanisms for keeping the main spindle perpendicular to the top surface of the table when the main spindle unit is moved to individual positions along a horizontal direction, wherein the controller makes up for the change in posture of the cross rail caused by the movement of the main spindle unit by separately controlling the amounts of movements of the individual parts of the cross rail produced by the individual supportive transfer mechanisms based on the correction data.

This correction of the posture of the cross rail makes it possible to maintain the main spindle perpendicular to the top surface of the table.

In one preferable approach to correcting the posture of the cross rail, the main spindle unit includes a tilt sensor for detecting inclination of the main spindle relative to the top surface of the table, wherein the controller makes up for the change in posture of the cross rail and keeps the main spindle perpendicular to the top surface of the table by separately controlling the amounts of movements of the individual parts of the cross rail produced by the individual supportive transfer mechanisms based on data on the inclination of the main spindle detected by the tilt sensor.

In the machine tool thus constructed, the tilt sensor detects the inclination of the main spindle relative to the top surface of the table and keeps the main spindle perpendicular to the top surface of the table on a real-time basis based on the detected inclination of the main spindle. This control operation makes it possible to maintain high machining accuracy during a process of machining the workpiece.

In a yet preferable approach to correcting the posture of the cross rail, the main spindle unit includes a main spindle shift mechanism for vertically moving the main spindle, wherein the controller adjusts the vertical position of the main spindle by controlling the amount of movement thereof produced by the main spindle shift mechanism to make up for a deviation of the distance between a cutting edge of the cutting tool and the top surface of the table from a predefined value caused by making up for the change in posture of the cross rail.

The aforementioned approach to making up for the change in posture of the cross rail by just controlling the amounts of movements of the individual parts of the cross rail produced by the individual supportive transfer mechanisms may possibly cause a slight vertical displacement of the main spindle unit, causing a deviation of the distance between the cutting edge of the cutting tool and the top surface of the table from the predefined value as a result of correction of the posture of the cross rail. However, the aforementioned control operation performed by use of the main spindle shift mechanism makes it possible to compensate for the deviation of the distance between the cutting edge of the cutting tool and the top surface of the table from the predefined value occurring as a result of correction of the posture of the cross rail. This in effect serves to prevent a reduction in work-machining accuracy caused by compensating for the change in posture of the cross rail.

Preferably, the machine tool further includes a storage unit storing data on the amount of vertical movement of the main spindle for correcting the distance between the cutting edge of the cutting tool and the top surface of the table to match the predefined value, the amount of vertical movement of the main spindle being premeasured with the main spindle unit moved to individual horizontal positions, wherein the controller controls the amount of vertical movement of the main spindle to be produced by the main spindle shift mechanism according to the current horizontal position of the main spindle unit based on the data on the amount of vertical movement of the main spindle.

This arrangement makes it possible to compensate for the deviation of the distance between the cutting edge of the cutting tool and the top surface of the table from the predefined value occurring as a result of correction of the posture of the cross rail at each horizontal position of the main spindle unit.

Still preferably, the machine tool is constructed such that the data on the amount of vertical movement of the main spindle for correcting the distance between the cutting edge of the cutting tool and the top surface of the table to match the predefined value stored in the storage unit for the individual horizontal positions of the main spindle unit includes data of the amount of vertical movement of the main spindle at individual vertical positions of the main spindle unit, wherein the controller controls the amount of vertical movement of the main spindle to be produced by the main spindle shift mechanism according to the current horizontal and vertical positions of the main spindle unit based on the data on the amount of vertical movement of the main spindle.

This arrangement makes it possible to compensate for the deviation of the distance between the cutting edge of the cutting tool and the top surface of the table from the predefined value occurring as a result of correction of the posture of the cross rail in an entire range of horizontal and vertical positions of the main spindle unit.

Yet preferably, the machine tool including the aforementioned controller is constructed such that the controller has a capability to tilt the cross rail in such a way that a downstream portion of the cross rail located downstream along the feed direction of the table becomes higher than an upstream portion of the cross rail located upstream along the feed direction of the table by separately controlling the amounts of movements of the individual parts of the cross rail produced by the individual supportive transfer mechanisms.

This capability of the machine tool makes it possible to maintain a work surface in good condition and prolong the useful life of the cutting tool. If the cutting tool is positioned such that a downstream side of the cutting tool opposite to an upstream side thereof which first goes into contact with the workpiece is located lower than the upstream side of the cutting tool even by a slight amount, the downstream side of the cutting tool may contact and damage an already cut part of the work surface. Contrary to this, if the controller tilts the cross rail such that the downstream portion of the cross rail becomes higher than the upstream portion thereof along the feed direction of the table, or such that the downstream side of the cutting tool opposite to the upstream side thereof which first goes into contact with the workpiece is slightly lifted, the downstream portion of the cutting tool is kept from contacting and damaging the already cut part of the work surface. This capability of the machine tool to prevent a contact between the downstream side of the cutting tool and the already cut part of the work surface serves to reduce contact time between the cutting tool and the workpiece, contributing eventually to retardation of the progress of wear of the cutting tool and prolongation of the useful life thereof.

This application is based on Japanese Patent application serial no. 2006-284760 filed in Japan Patent Office on Oct. 19, 2006, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter are defined, they should be construed as being included therein.

What is claimed is:

1. A machine tool for machining a workpiece by moving a cutting tool relative to the workpiece while rotating the cutting tool, said machine tool comprising:

a table configured to be movable along a specific feed direction in a horizontal plane with the workpiece placed on a top surface of said table;

a main spindle unit including a main spindle for rotating said cutting tool attached thereto with said main spindle positioned perpendicular to the top surface of said table, said main spindle unit being configured to be movable along a moving direction perpendicular to the feed direction of said table in a horizontal plane above said table;

a cross rail supporting said main spindle unit in such a manner that said main spindle unit can move along said moving direction perpendicular to the feed direction of said table in the horizontal plane;

a plurality of columns for vertically guiding said cross rail, said columns being erected at positions on opposite sides of said table along the moving direction of said main spindle unit and said columns being located on front and rear sides of the center of gravity of said main spindle unit along the feed direction of said table; and a supportive transfer system including a member coming into direct contact with said cross rail to support said cross rail and operable to give a drive power to said cross rail to move said cross rail vertically;

wherein said cross rail has a pair of supporting portions for supporting front and rear portions of said main spindle unit located frontward and rearward along the feed direction of said table with respect to the center of gravity of said main spindle unit, respectively, and a plurality of through holes through which said plurality of columns are passed vertically.

2. The machine tool according to claim 1, wherein said columns each have a circular cross section in top view and said through holes each have a circular shape in top view to allow said columns to pass through.

3. The machine tool according to claim 1, wherein said supportive transfer system includes front-side supportive transfer mechanisms and rear-side supportive transfer mechanisms which are installed at positions on both left and right sides of the moving direction of said main spindle unit with said table positioned in between, said front- and rear-side supportive transfer mechanisms disposed on each side of said table being separated by a specific distance from each other along the feed direction of said table;

wherein said front- and rear-side supportive transfer mechanisms installed on the left side of said table support a portion of said cross rail located to the left of the center of gravity thereof, whereas said front- and rear-side supportive transfer mechanisms installed on the right side of said table support a portion of said cross rail located to the right of the center of gravity thereof; and wherein said front-side supportive transfer mechanisms support a portion of said cross rail located to the front of the center of gravity thereof, whereas said rear-side supportive transfer mechanisms support a portion of said cross rail located to the rear of the center of gravity thereof.

4. The machine tool according to claim 3 further comprising a controller for controlling movement of said cross rail produced by said supportive transfer mechanisms, said controller having a capability to separately control the amounts of vertical movements of individual parts of said cross rail produced by said individual supportive transfer mechanisms to make up for a change in posture of said cross rail caused by movement of said main spindle unit in order thereby to keep said main spindle perpendicular to the top surface of said table.

5. The machine tool according to claim 4 further comprising:
a storage unit storing correction data which includes premeasured values of the amounts of movements of the individual parts of said cross rail to be produced by said individual supportive transfer mechanisms for keeping said main spindle perpendicular to the top surface of said table when said main spindle unit is moved to individual positions along a horizontal direction;
wherein said controller makes up for the change in posture of said cross rail caused by the movement of said main spindle unit by separately controlling the amounts of movements of the individual parts of said cross rail produced by said individual supportive transfer mechanisms based on said correction data.

6. The machine tool according to claim 4, wherein said main spindle unit includes a tilt sensor for detecting inclination of said main spindle relative to the top surface of said table; and
wherein said controller makes up for the change in posture of said cross rail and keeps said main spindle perpendicular to the top surface of said table by separately controlling the amounts of movements of the individual parts of said cross rail produced by said individual supportive transfer mechanisms based on data on the inclination of said main spindle detected by said tilt sensor.

7. The machine tool according to claim 4, wherein said main spindle unit includes a main spindle shift mechanism for vertically moving said main spindle; and
wherein said controller adjusts the vertical position of said main spindle by controlling the amount of movement thereof produced by said main spindle shift mechanism to make up for a deviation of the distance between a cutting edge of the cutting tool and the top surface of said table from a predefined value caused by making up for the change in posture of said cross rail.

8. The machine tool according to claim 7 further comprising:
a storage unit storing data on the amount of vertical movement of said main spindle for correcting the distance between the cutting edge of the cutting tool and the top surface of said table to match the predefined value, said amount of vertical movement of said main spindle being premeasured with said main spindle unit moved to individual horizontal positions;
wherein said controller controls the amount of vertical movement of said main spindle to be produced by said main spindle shift mechanism according to the current horizontal position of said main spindle unit based on said data on the amount of vertical movement of said main spindle.

9. The machine tool according to claim 8, wherein said data on the amount of vertical movement of said main spindle for correcting the distance between the cutting edge of the cutting tool and the top surface of said table to match the predefined value stored in said storage unit for the individual horizontal positions of said main spindle unit includes data of the amount of vertical movement of said main spindle at individual vertical positions of said main spindle unit; and wherein said controller controls the amount of vertical movement of said main spindle to be produced by said main spindle shift mechanism according to the current horizontal and vertical positions of said main spindle unit based on said data on the amount of vertical movement of said main spindle.

10. The machine tool according to claim 4, wherein said controller has a capability to tilt said cross rail in such a way that a downstream portion of said cross rail located downstream along the feed direction of said table becomes higher than an upstream portion of said cross rail located upstream along the feed direction of said table by separately controlling the amounts of movements of the individual parts of said cross rail produced by said individual supportive transfer mechanisms.

11. The machine tool according to claim 1, wherein the plurality of through holes in the cross rail comprise four through holes and wherein the plurality of columns comprise four columns passing respectively through the through holes of the cross rail.

12. The machine tool according to claim 11, wherein the plurality of columns comprise first and second columns disposed on a first side of said table and spaced from one another along the moving direction of said main spindle unit, said plurality of columns further comprising third and fourth columns disposed on a second side of said table and spaced from one another along the moving direction of said main spindle unit.

13. The machine tool according to claim 12, wherein the supportive transfer system comprises first and second transfer mechanisms disposed on the first side of the table and spaced from one another along the moving direction of the main spindle unit and third and fourth supportive transfer mechanisms disposed on the second side of the table and spaced from one another along the moving direction of said main spindle unit.

14. The machine tool according to claim 13, wherein the supportive transfer mechanism are spaced from the columns.

15. The machine tool according to claim 1, wherein the supportive transfer system is provided separately from the columns.

16. A machine tool for machining a workpiece by moving a cutting tool relative to the workpiece while rotating the cutting tool, said machine tool comprising:
a table configured to be movable along a specific feed direction in a horizontal plane with the workpiece placed on a top surface of said table;
a main spindle unit including a main spindle for rotating said cutting tool attached thereto with said main spindle positioned perpendicular to the top surface of said table, said main spindle unit being configured to be movable substantially linearly along a moving direction perpendicular to the feed direction of said table in a horizontal plane above said table;
a cross rail supporting said main spindle unit in such a manner that said main spindle unit can move along said moving direction perpendicular to the feed direction of said table in the horizontal plane, said cross rail having first and second supporting portions spaced from one another along the feed direction of said table, the supporting portions being disposed substantially symmetrically with respect to a center of gravity of said main spindle unit, first and second pairs of through holes extending substantially vertically through the first and second supporting portions respectively;
first and second pairs of columns erected respectively on opposite first and second sides of the table and the columns in each of said pairs being spaced from one another along the moving direction of said main spindle unit, the columns passing vertically through the respective through holes of the cross rail for guiding a vertical movement of the cross rail; and a supportive transfer system provided separately from the columns, the supportive transfer system including at least one member coming into direct contact with said cross rail to support said cross rail and operative to drive said cross rail vertically.

17. A machine tool according to claim 16, wherein the supportive transfer system includes four supportive transfer mechanisms, each supportive transfer mechanism including a driving device engaged directly with said cross rail.

* * * * *

UNITED STATES PATENT AND TRADEMARK OFFICE
CERTIFICATE OF CORRECTION

PATENT NO. : 7,506,426 B2 Page 1 of 1
APPLICATION NO. : 11/897398
DATED : March 24, 2009
INVENTOR(S) : Miki Ryuhan, Koji Kashu and Akira Inoue It is certified that error appears in the above-identified patent and that said Letters Patent is hereby corrected as shown below:

Title Page,
Item (30)  Foreign Application Priority Data should read as follows:

Oct. 19, 2006   (JP)  .................................. 2006-284760

Signed and Sealed this

Twenty-sixth Day of May, 2009

JOHN DOLL
*Acting Director of the United States Patent and Trademark Office*